Jan. 6, 1670   J. W. RUSTOWICZ   3,487,576
FISHING LURE
Filed March 23, 1967
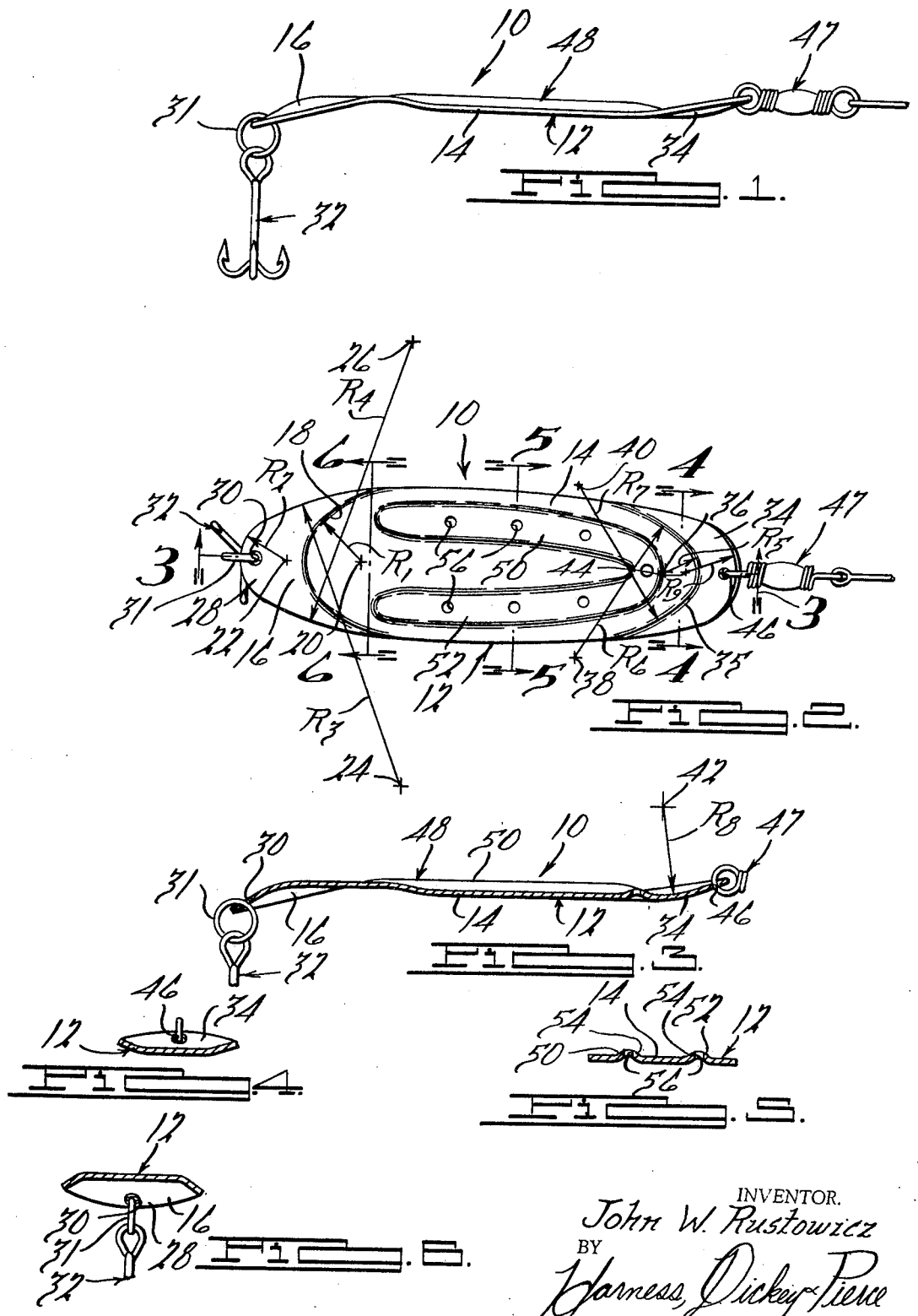
INVENTOR.
John W. Rustowicz
BY
Harness, Dickey Pierce
ATTORNEYS.

United States Patent Office

3,487,576
Patented Jan. 6, 1970

3,487,576
FISHING LURE
John W. Rustowicz, 42150 Hanks Lane,
Utica, Mich. 48087
Filed Mar. 23, 1967, Ser. No. 625,537
Int. Cl. A01k 79/02, 85/00
U.S. Cl. 43—17.1                3 Claims

ABSTRACT OF THE DISCLOSURE

A fishing lure comprising an elongated, generally spoon-shaped body having a substantially planar intermediate section, an upwardly inclined forward section with fish line attaching means thereon, and a downwardly inclined rearward section with fish hook attaching means thereon; the body being formed with a generally V-shaped ridge extending along the intermediate section thereof and having at least one perforation formed therein for producing fish-attracting sonic vibrations as the lure moves through the water.

BACKGROUND OF THE INVENTION

In the design and manufacture of artificial fishing lures, there are several prerequisites which should be satisfied in order to provide a lure that may be used successfully in catching fish. Some of the more important of such prerequisites are that the lure be of a size, configuration and color to be attractive to fish, and that the motion of the lure as it moves through the water be such as to attract the attention of the fish, either through visual or audible means. Toward these ends, artificial fishing lures are generally constructed to move through the water in a manner as is thought to simulate the motion of a minnow or other bait fish, and/or to create an audible signal as the lure passes through the water. Additionally, it is desirable that the lure be colored or have certain light-reflective characteristics so that fish will be attracted toward the lure from remote locations. Generally speaking, fishing lures must also be of a strong and rugged construction so as not to be damaged by large fish, rocks, logs or other obstructions which they may encounter as they are pulled through the water. At the same time, such fishing lures must be a relatively simple design, easy to assemble and economical to commercially manufacture.

One class of fishing lures which have been extremely successful in satisfying the above prerequisites are generally categorized as spoon-type lures. Such spoon lures, or "spoons" as they are commonly called, generally comprise an ovoidal-shaped body member which is stamped of sheet metal and given a high polish or bright color so as to have high light-reflective characteristics when drawn through the water. Such spoons are usually used alone, although they are sometimes used in conjunction with auxiliary fish attracting means such as feathers, bunches of hair or other simulated forms of aquatic life which is attached at some position on the spoon itself or to the fish hook associated therewith. Spoon-type lures are almost unanimously characterized by unusual eccentric motion produced during retrieval, such eccentricity of motion being intended to simulate the action of some type of aquatic life swimming through the water.

Broadly speaking, the present invention is directed toward a spoon-type fishing lure of the above type and is adapted to be drawn through the water in a manner such that light-reflecting and audible signal-producing characteristics are achieved. The fishing lure of the present invention includes a body portion having arcuately-shaped forward and rearward sections and is provided with means in the form of a generally V-shaped ridge and a plurality of perforations adapted to produce an audible signal upon movement of the lure through the water. The configuration of the lure is designed such that the lure oscillates or wiggles as it moves through the water, as well as periodically revolving about its longitudinal axis, whereby to enhance the light-reflecting characteristics thereof. A gang-type fish hook is intended to be attached at the rearward end of the lure, while the forward end thereof is adapted to be secured to an associated fishing line or leader.

A fishing lure constructed in accordance with the principles of the present invention meets all of the aforementioned prerequisites of a successful fishing lure, and it is intended that the subject lure be made of sheet metal or the like with the various curvatures in the lure body easily being formed by means of a single stamping operation, with the result that the lure will be economical to commercially manufacture.

SUMMARY OF THE INVENTION

This invention relates generally to fishing lures and, more particularly, to a spoon-type fishing lure of a type having improved fish attracting characteristics.

It is a general object of the present invention to provide a new and improved fishing lure of the above described character.

It is a more particular object of the present invention to provide a fishing lure of the above character which moves or oscillates in a fish-like manner when drawn through the water, as, for example, when retrieving the lure or during trolling.

It is a more particular object of the present invention to provide a new and improved spoon-type fishing lure which exhibits improved light-reflecting and audible signal-producing characteristics.

It is another object of the present invention to provide a new and improved fishing lure of the above character which is of extremely simple design and is thus economical to commercially manufacture.

It is a further object of the present invention to provide a new and improved fishing lure of the above character which is of a durable construction and thus will have a long operational life.

Other objects and advantages of the present invention will become apparent from the following detailed description taken in conjunction with the accompanying drawing.

BRIEF DESCRIPTION OF THE DRAWING

FIGURE 1 is a longitudinal side elevational view of a fishing lure constructed in accordance with the preferred embodiment of the present invention;

FIGURE 2 is a top elevational view of the fishing lure illustrated in FIGURE 1;

FIGURE 3 is a longitudinal cross-sectional view of the fishing lure illustrated in FIGURE 2, as taken substantially along the line 3—3 thereof;

FIGURE 4 is a transverse cross-sectional view taken substantially along the line 4—4 of FIGURE 2;

FIGURE 5 is a transverse cross-sectional view taken substantially along the line 5—5 of FIGURE 2, and FIGURE 6 is a transverse cross-sectional view of the fishing lure illustrated in FIGURE 2, as taken substantially along the line 6—6 thereof.

DETAILED DESCRIPTION OF THE PREFERRED EMBODIMENT

For purposes of description, the terms "inwardly" and "outwardly" have reference to the geometric center of the fishing lure of the present invention. Likewise, the terms "forwardly," "rearwardly" and derivatives thereof have reference to the fishing lure of the present invention as shown in FIGURES 1 through 6, with the forward end of the fishing lure being located at the right side of FIGURES 1 through 3.

Referring now in detail to the drawing, a fishing lure 10, in accordance with a preferred embodiment of the present invention, is shown as comprising a generally ovate or spoon-shaped, one-piece body member 12 which, for purposes of clarity of description, may be considered to comprise three different, integrally connected sections.

The first of these sections is a substantially flat or planar middle or intermediate section 14 which extends longitudinally of the body member 12 substantially along the entire length thereof.

The second section of the body member 12 is referred to as the rearward section and is indicated by the numeral 16. The section 16 is bent or curved downwardly and rearwardly from the plane of the intermediate section 14 along an arcuate line 18 located at a radius $R_1$ from a center point 20 on the longitudinal axis of the body member 12. The outer or rearward edge of the section 16 is of a generally parabolic configuration and is defined by blended curved lines lying at radii $R_2$, $R_3$ and $R_4$ from center points 22, 24 and 26, respectively. The terminal (rearmost) portions 28 of the section 16 is provided with a suitable aperture or the like 30 having a ring-shaped attaching member 31 extending therethrough for the purpose of connecting the usual gang-type or treble hook assembly 32 to the body member 12.

The third section of the body member 12 is referred to as the forward section and is designated by the numeral 34. The section 34 is of a compound curvature, a first portion of the curvature bending or curving upwardly from the plane of the intermediate section 14 along a generally parabolic line 35 defined by blended curved lines lying at radii $R_5$, $R_6$ and $R_7$ from center points 36, 38 and 40, respectively. The second part of the curvature of the section 34 is at a radius $R_8$ from a center point 42, as seen in FIGURE 3. The outer (forwardmost) part of the section 34 is defined by a curved line located at a radius $R_9$ from the center point 44 and is adapted to have a suitable aperture 46 formed therein to which a fishing line may be attached in the usual manner. For certain types of applications such as trolling, a suitable swivel device 47 may be attached to the body member 12 by way of the aperture 46 to permit relatively free rotation of the fishing lure 10 relative to the associated fishing line.

As best seen in FIGURE 2, a generally V-shaped rib or ridge 48 is formed in the intermediate section 14 of the body member 12. More particularly, the ridge 48 comprises a pair of slightly arcuate-shaped ridge portions 50 and 52 which intersect at their forward ends approximately at the aforementioned center point 36, the portions 50, 52 terminating at their rearward ends just forwardly of the center point 20. Each of the ridge portions 50, 52 extends upwardly from the plane of the intermediate section 14 and is approximately semi-circular in transverse cross section, as shown in FIGURE 5, the lateral edges and ends of the ridge portions 50, 52 blending smoothly into the intermediate section 14, as seen at 54. In a preferred construction, the ridge portions 50, 52 are symmetrically oriented on the body member 12.

A plurality of longitudinally spaced apertures or perforations, generally designated 56, are formed in each of the ridge portions 50, 52, and permit water to flow from one side of the body member 12 to the other side thereof as the fishing lure 10 moves through the water. It has been found that water flowing over and around the V-shaped ridge 48 in the body section 14, together with the aforesaid water flowing through the perforations 56, results in sonic vibrations or signals being produced in the water which attract fish toward the lure and thereby enhance the fish catching characteristics thereof. It is believed that the fish-attracting sonic vibrations produced by the body member 12 are attributable, at least in part, to the relatively sharp deviation or angle of the forward and rearward body sections 34, 16, respectively, with respect to the plane of the intermediate section 14, as well as to the plurality of apertures 56.

In a preferred construction of the fishing lure 10 of the present invention, the lower side thereof is preferably given a coating of a light reflecting material, or alternatively, the body member 12 may be fabricated of a material which is highly reflective, such as stainless steel. The upper side of the body member 12 is preferably painted a color which has the best fish-attracting characteristics for a specific type of fishing or a particular geographical location. It will be apparent, of course, that both the upper and lower sides of the body member 12 may be of a light-reflective character, or they may be both painted either the same color or different colors. Also, it will be obvious that certain fish attracting designs or indicia, as well known in the art, may be provided on either or both the upper or lower sides of the body member 12, depending upon the intended use of the lure 10.

In operation, the fishing lure 10 is adapted to be pulled through the water as, for example, during trolling, by forward movement of a boat, or alternatively, during bait casting, by retrieving the lure upon rewinding the fishing line on the associated fishing reel. Due to the lateral symmetry of the body member 12, the lure 10 is basically unstable as it moves through the water and will thereby tend to rotate about the longitudinal axis thereof, the particular direction in which the body member 12 rotates depending mainly on the method in which the lure is being trolled or retrieved and upon any existing currents in the water through which the lure 10 is moving. In any event, such rotation results in the reflective (lower) side of the lure 10 being exposed to different directions for indeterminate periods of time. Simultaneously, due to the fact that the rearward section 16 and forward section 34 of the body member 12 extend in opposite directions from the plane of the intermediate section 14 thereof, the body member 12 will "wiggle" or oscillate as the lure 10 moves through the water, thereby simulating the action of the live fish. The overall result of the oscillating and rotating action of the body member 12 is that the lure provides a source of reflected light which moves through the water in a manner similar to a swimming fish while concurrently producing the aforedescribed audible fish-attracting signals. Since the motion of the lure as it moves through the water is substantially regular, that is, along a straight line, fish will be able to judge where to best strike the lure without having it suddenly move away from them, with the result that the fishing lure 10 will function to readily attract fish, both by audible and visible means, and will have an action which may easily be struck at by the fish.

While it will be apparent that the preferred embodiment illustrated herein is well calculated to fulfill the objects above stated, it will be appreciated that the fishing lure 10 of the present invention is susceptible to modification, variation and change.

I claim:

1. A fishing lure comprising an elongated spoon-shaped body, said body having an upwardly inclined forward section, a downwardly inclined rearward section and a substantially planar intermediate section extending between said forward and rearward sections, said forward section extending upwardly and forwardly from the plane of said intermediate section along a generally parabolic line and having a generally semi-circular shaped outer edge, said rearward section extending downwardly and rearwardly from the plane of said intermediate section along a generally semi-circular line and having a generally parabolic-shaped outer edge, said intermediate section being formed with a generally V-shaped ridge comprising first and second ridge sections extending along the major length of said intermediate body section with the rearward ends of said ridge sections being spaced laterally away from one another and terminating adjacent the sides of said body immediately forwardly of said rearward body section and the forward ends of said ridge sections converging toward one another and merging at a position centrally of said body immediately rearwardly of said forward body section.

2. A fishing lure comprising an elongated spoon-shaped body, said body having an upwardly inclined forward section, a downwardly inclined rearward section and a substantially planar intermediate section extending between said forward and rearward sections and having a generally V-shaped ridge portion projecting therefrom, said ridge portion comprising first and second ridge sections extending along the major length of said intermediate body section with the rearward ends of said ridge sections being spaced laterally away from one another and terminating adjacent the sides of said body immediately forwardly of said rearward body section and the forward ends of said ridge sections converging toward one another and merging at a position centrally of said body immediately rearwardly of said forward body section, said forward and rearward sections of said body being of a generally arcuate configuration, a plurality of perforations formed in each of said first and second ridge sections, and at least one surface of said body being of a light-reflective character.

3. A fishing lure comprising an elongated spoon-shaped body, said body having an upwardly inclined forward section, a downwardly inclined rearward section and a substantially planar intermediate section extending between said forward and rearward sections and having a generally V-shaped ridge portion projecting therefrom, said ridge portion comprising first and second ridge sections extending along the major length of said intermediate body section with the rearward ends of said ridge sections being spaced laterally away from one another and terminating adjacent the sides of said body immediately forwardly of said rearward body section and the forward ends of said ridge sections converging toward one another and merging at a position centrally of said body immediately rearwardly of said forward body section, and a plurality of longitudinally-spaced perforations formed in said ridge sections, whereby said perforations are arranged in converging rows located out of the plane of said intermediate body section.

References Cited

UNITED STATES PATENTS

| 2,065,246 | 12/1936 | Saarinen | 43—42.5 X |
| 2,986,812 | 6/1961 | Arter et al. | 43—42.5 X |
| 3,143,825 | 8/1964 | Borgstrom | 43—42.06 X |
| 3,221,435 | 12/1965 | St. Amant | 43—42.06 |
| 3,370,375 | 2/1968 | Ottonello | 43—42.06 X |

SAMUEL KOREN, Primary Examiner

D. L. LEACH, Assistant Examiner

U.S. Cl. X.R.

43—42.06, 42.5